US012722742B2

(12) United States Patent
Olason et al.

(10) Patent No.: US 12,722,742 B2
(45) Date of Patent: Sep. 1, 2026

(54) REVERSIBLE BELT DRIVE ASSEMBLIES FOR SNOWMOBILES

(71) Applicant: Arctic Cat Inc., Thief River Falls, MN (US)

(72) Inventors: Kyle D. Olason, Thief River Falls, MN (US); Samuel James Sandoz, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 422 days.

(21) Appl. No.: 18/402,955

(22) Filed: Jan. 3, 2024

(65) Prior Publication Data

US 2024/0294231 A1 Sep. 5, 2024

Related U.S. Application Data

(60) Provisional application No. 63/449,640, filed on Mar. 3, 2023.

(51) Int. Cl.

| | |
|---|---|
| ***B62M 27/02*** | (2006.01) |
| ***B62M 9/04*** | (2006.01) |
| ***B62M 11/14*** | (2006.01) |
| ***F16H 59/02*** | (2006.01) |

(52) U.S. Cl.

CPC .............. *B62M 27/02* (2013.01); *B62M 9/04* (2013.01); *B62M 11/14* (2013.01); *F16H 59/02* (2013.01)

(58) Field of Classification Search

CPC ........ B62M 9/04; B62M 11/04; B62M 27/02; F16H 59/02; B60Y 2200/252

See application file for complete search history.

(56) References Cited

U.S. PATENT DOCUMENTS

| | | | | |
|---|---|---|---|---|
| 3,529,494 | A | 9/1970 | Gaston | |
| 3,688,604 | A | 9/1972 | Gunther | |
| 3,884,097 | A * | 5/1975 | Avramidis | B62M 27/02 475/213 |
| 4,502,353 | A * | 3/1985 | Beaudoin | F16H 37/022 475/326 |
| 4,602,525 | A * | 7/1986 | Moroto | F16H 37/022 475/284 |
| 6,860,826 | B1 | 3/2005 | Johnson | |
| 6,951,523 | B1 | 10/2005 | Dieter et al. | |
| 8,001,862 | B2 | 8/2011 | Albulushi et al. | |
| 10,001,200 | B2 | 6/2018 | Parraga et al. | |

(Continued)

FOREIGN PATENT DOCUMENTS

WO 8607423 A1 12/1986

*Primary Examiner* — Minh Truong
*Assistant Examiner* — Mark K Buse
(74) *Attorney, Agent, or Firm* — Billion & Armitage

(57) ABSTRACT

A powertrain for a snowmobile includes an engine, a gearbox input shaft receiving rotational energy from the engine and a reversible belt drive assembly coupled to the gearbox input shaft. The reversible belt drive assembly is switchable between a forward mode and a reverse mode and includes a pulley, a planetary gear system coaxial with the pulley and a selector collar assembly interposed between the pulley and the planetary gear system translatable between a first position to form a forward geartrain bypassing the planetary gear system in the forward mode and a second position to form a reverse geartrain including the planetary gear system in the reverse mode.

20 Claims, 13 Drawing Sheets

(56) References Cited

U.S. PATENT DOCUMENTS

| | | | | |
|---|---|---|---|---|
| 11,220,310 | B2 | 1/2022 | Pard et al. | |
| 11,415,207 | B2 | 8/2022 | Pard et al. | |
| 2002/0117342 | A1* | 8/2002 | Schoenfelder | B62M 27/02 180/182 |
| 2006/0270506 | A1* | 11/2006 | Larson | F16H 37/022 475/207 |

* cited by examiner 288 278 264 278b 264a 282a 284a 264b 274 268b 272 268 286b 268a 288 278 264 268a 284a 272 268b 268 282a 264b 264a 270 278a 280 278 264a 264 264b 270 268a 268 274 268b 282a 272 286b 284a 278b 288

REVERSIBLE BELT DRIVE ASSEMBLIES FOR SNOWMOBILES

CROSS-REFERENCE TO RELATED APPLICATIONS

The present application claims the benefit of U.S. Provisional Application No. 63/449,640, filed Mar. 3, 2023, the entire contents of which is hereby incorporated by reference.

TECHNICAL FIELD OF THE DISCLOSURE

The present disclosure relates, in general, to drivetrains for use in land vehicles such as snowmobiles and, in particular, to reversible belt drive assemblies for use in snowmobile drivetrains, the reversible belt drive assemblies including a planetary gear system and a selector collar assembly translatable to form a forward geartrain bypassing the planetary gear system in a forward mode or a reverse geartrain including the planetary gear system in a reverse mode.

BACKGROUND

Snowmobiles are popular land vehicles used in cold and snowy weather conditions across a wide variety of transportation and recreational applications such as deep snow transit, luxury touring and trail riding. Many modern snowmobiles are equipped with reverse capability to allow the snowmobile to perform certain operations or maneuvers including backing out of a garage or reversing out of an obstacle such as a snow drift or ditch. Some types of engines such as certain two-stroke engines are reversible and therefore capable of propelling a snowmobile in both the forward and reverse directions without the need for additional gearing. Other types of engines such as certain four-stroke engines, however, are operable in only a single direction and therefore require additional gearing to enable reverse capability for the snowmobile. Such gearing mechanisms are often complex and require multiple chains or an enclosed housing filled with oil, adding to the overall weight of the snowmobile. The complex nature of such gearing mechanisms also increases the wear susceptibility of the components therein. Accordingly, a need has arisen for snowmobile drivetrain improvements that provide reverse capability to snowmobiles lacking a reversible engine while avoiding the complexity, weight and wear susceptibility seen in current reverse gearing mechanisms for snowmobiles.

SUMMARY

In a first aspect, the present disclosure is directed to a powertrain for a snowmobile including an engine, a gearbox input shaft receiving rotational energy from the engine and a reversible belt drive assembly coupled to the gearbox input shaft. The reversible belt drive assembly is switchable between a forward mode and a reverse mode and includes a pulley, a planetary gear system coaxial with the pulley and a selector collar assembly interposed between the pulley and the planetary gear system translatable between a first position to form a forward geartrain bypassing the planetary gear system in the forward mode and a second position to form a reverse geartrain including the planetary gear system in the reverse mode.

In some embodiments, the gearbox input shaft, the pulley, the selector collar assembly and the planetary gear system may be coaxial to form a common axis therewith, and the selector collar assembly may be translatable along the common axis. In certain embodiments, the pulley may form a central bore therethrough, and the gearbox input shaft may extend through the central bore of the pulley. In some embodiments, the planetary gear system may be disposed on an outboard side of the pulley. In certain embodiments, the selector collar assembly may include a central body having a central bore therethrough. In such embodiments, the gearbox input shaft may extend at least partially through the central bore of the central body and the central body may be slidably coupled to the gearbox input shaft via a spline. In some embodiments, the selector collar assembly may include a central body having a pulley-facing side and a planetary gear system-facing side. In such embodiments, the pulley-facing side of the central body may be engaged with the pulley via first dogs in the first position and the planetary gear system-facing side of the central body may be engaged with the planetary gear system via second dogs in the second position. In certain embodiments, the selector collar assembly may include a reverse engagement ring rotatably coupled to the central body, and the reverse engagement ring may be engaged with the planetary gear system via third dogs in the second position. In some embodiments, the planetary gear system-facing side of the central body may be engaged with a sun gear of the planetary gear system via the second dogs in the second position and the reverse engagement ring may be engaged with a planetary carrier of the planetary gear system via the third dogs in the second position. In certain embodiments, the reverse engagement ring may be coupled to the pulley via a spline to transfer rotational energy from the planetary gear system to the pulley in the reverse mode. In some embodiments, the pulley-facing side of the central body may be disengaged from the pulley in the second position and the planetary gear system-facing side of the central body and the reverse engagement ring may be disengaged from the planetary gear system in the first position. In certain embodiments, the first position of the selector collar assembly may be inboard of the second position. In some embodiments, the selector collar assembly may have a pulley-facing side and both the pulley and the gearbox input shaft may be at least partially disposed on the pulley-facing side of the selector collar assembly. In certain embodiments, the forward geartrain may include gears in the following sequence: (1) the gearbox input shaft, then (2) the selector collar assembly then (3) the pulley. In some embodiments, the reverse geartrain may include gears in the following sequence: (1) the gearbox input shaft, then (2) the selector collar assembly, then (3) the planetary gear system, then (4) the selector collar assembly then (5) the pulley. In certain embodiments, the reversible belt drive assembly may include an actuator coupled to the selector collar assembly to translate the selector collar assembly between the first and second positions. In some embodiments, the planetary gear system may include a planetary gear system housing, and the actuator may be coupled to the planetary gear system housing. In certain embodiments, the planetary gear system may include a sun gear forming a central bore therethrough and the actuator may include an actuator rod extending through the central bore of the sun gear. In some embodiments, the selector collar assembly may include an actuator linkage including a bearing and the actuator rod may be coupled to the actuator linkage. In such embodiments, the actuator linkage may transfer translational motion from the actuator rod to the selector collar assembly, and the selector collar assembly may be freely rotatable relative to the actuator rod via the bearing.

In a second aspect, the present disclosure is directed to a snowmobile including a chassis and a powertrain coupled to the chassis. The powertrain includes an engine, a gearbox input shaft receiving rotational energy from the engine and a reversible belt drive assembly coupled to the gearbox input shaft. The reversible belt drive assembly is switchable between a forward mode and a reverse mode and includes a pulley, a planetary gear system coaxial with the pulley and a selector collar assembly interposed between the pulley and the planetary gear system translatable between a first position to form a forward geartrain bypassing the planetary gear system in the forward mode and a second position to form a reverse geartrain including the planetary gear system in the reverse mode. The snowmobile also includes a drive track receiving rotational energy from the reversible belt drive assembly such that the drive track is moveable in a first direction to propel the snowmobile forward in the forward mode and a second, opposite direction to propel the snowmobile backward in the reverse mode.

In some embodiments, the pulley is an upper pulley and the reversible belt drive assembly may include a lower pulley and a belt engaging the upper and lower pulleys. In such embodiments, the powertrain may include a track driveshaft coupled to the lower pulley to transfer rotational energy to the drive track, the track driveshaft rotating in a first direction in the forward mode and a second, opposite direction in the reverse mode. In certain embodiments, the powertrain may include a continuously variable transmission coupled to the engine to receive rotational energy therefrom, and the gearbox input shaft may receive rotational energy from the engine via the continuously variable transmission. In some embodiments, the snowmobile may include a handlebar including a reverse mode selector engageable by an operator to select between the forward and reverse modes. In certain embodiments, the pulley may include an output shaft portion coupled to an outer gear teeth portion.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

Figure 1A:
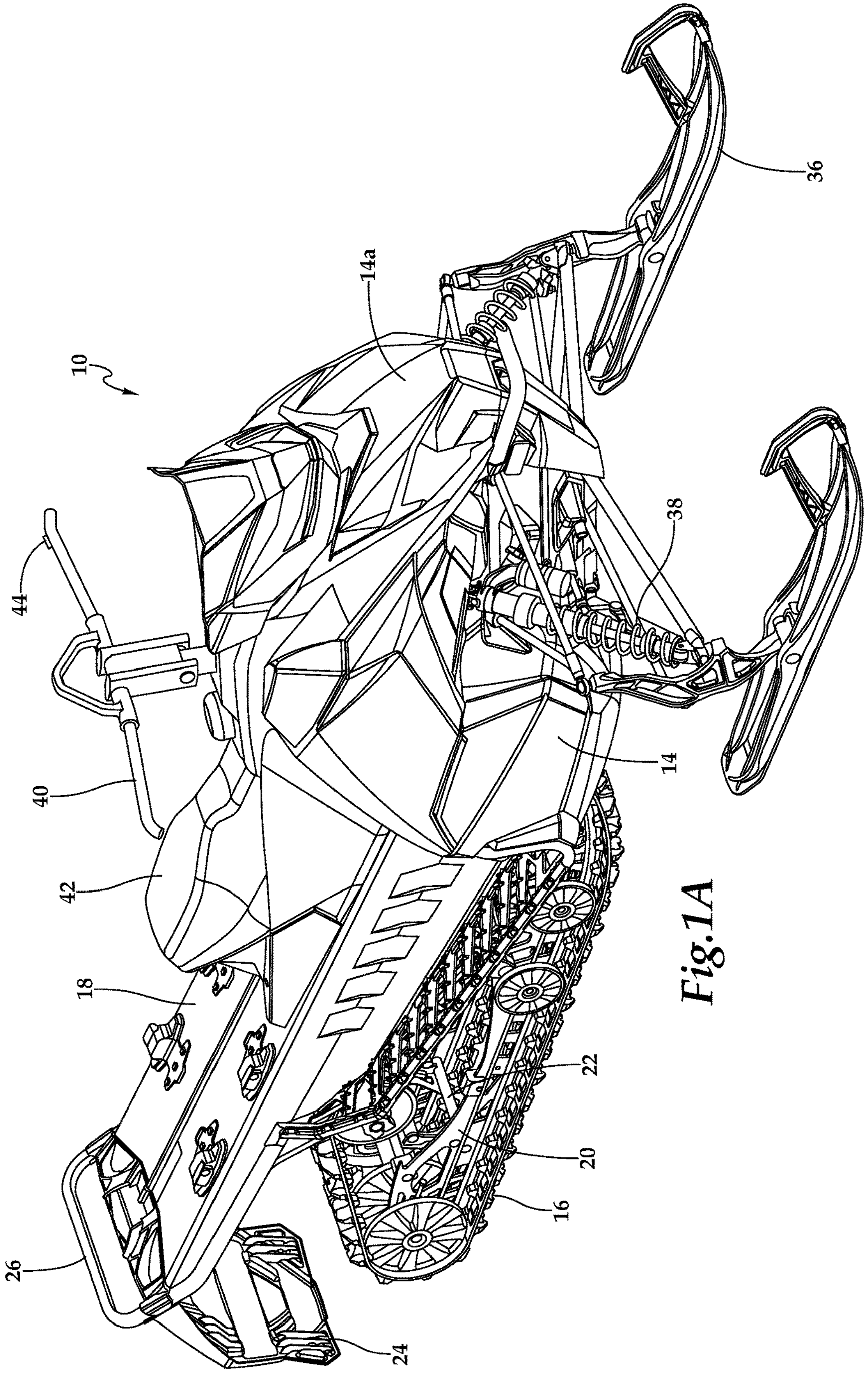
FIGS. 1A-1D are schematic illustrations of a snowmobile having a reversible belt drive assembly in accordance with embodiments of the present disclosure.
Figure 1B:
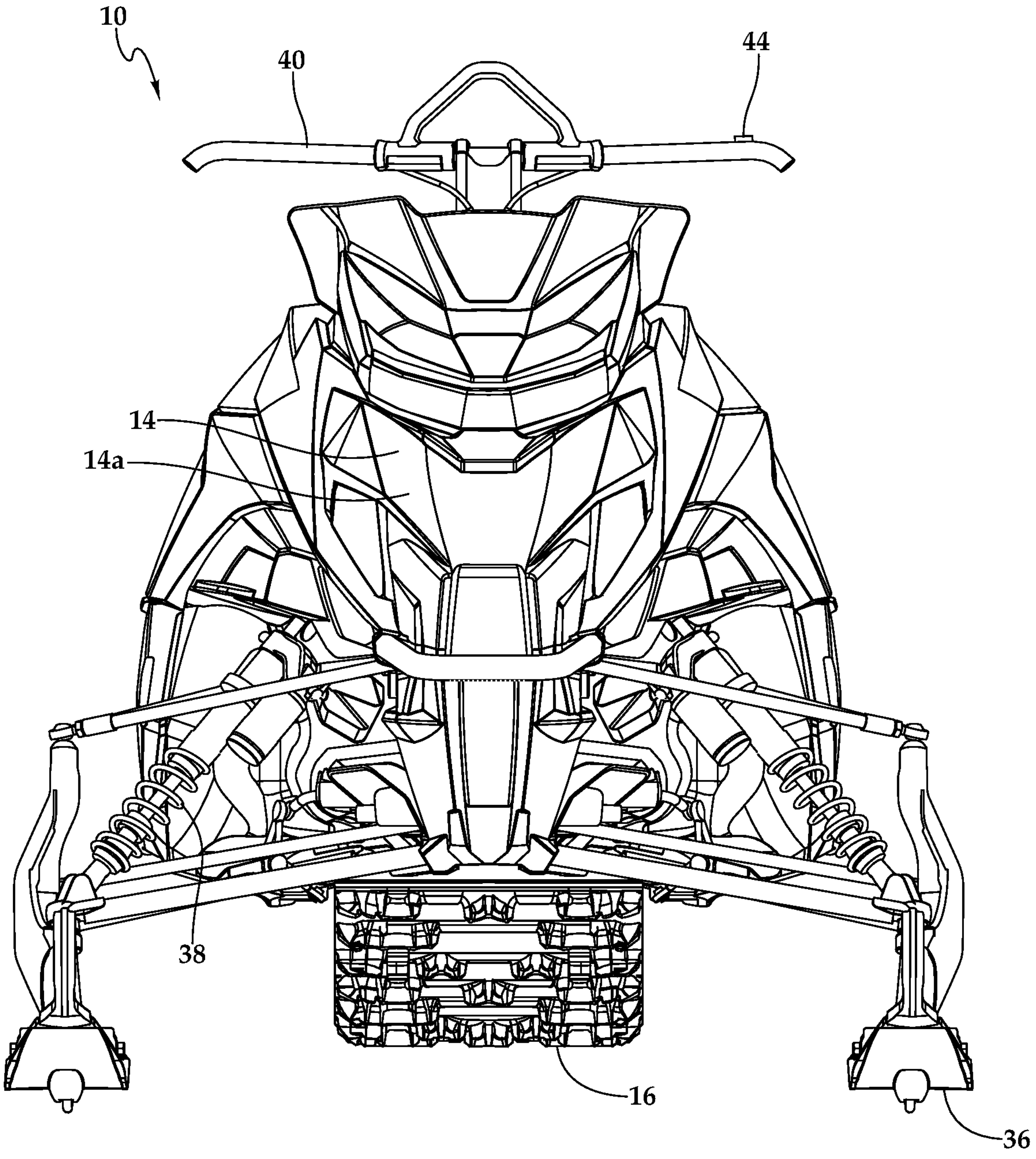
Figure 1C:
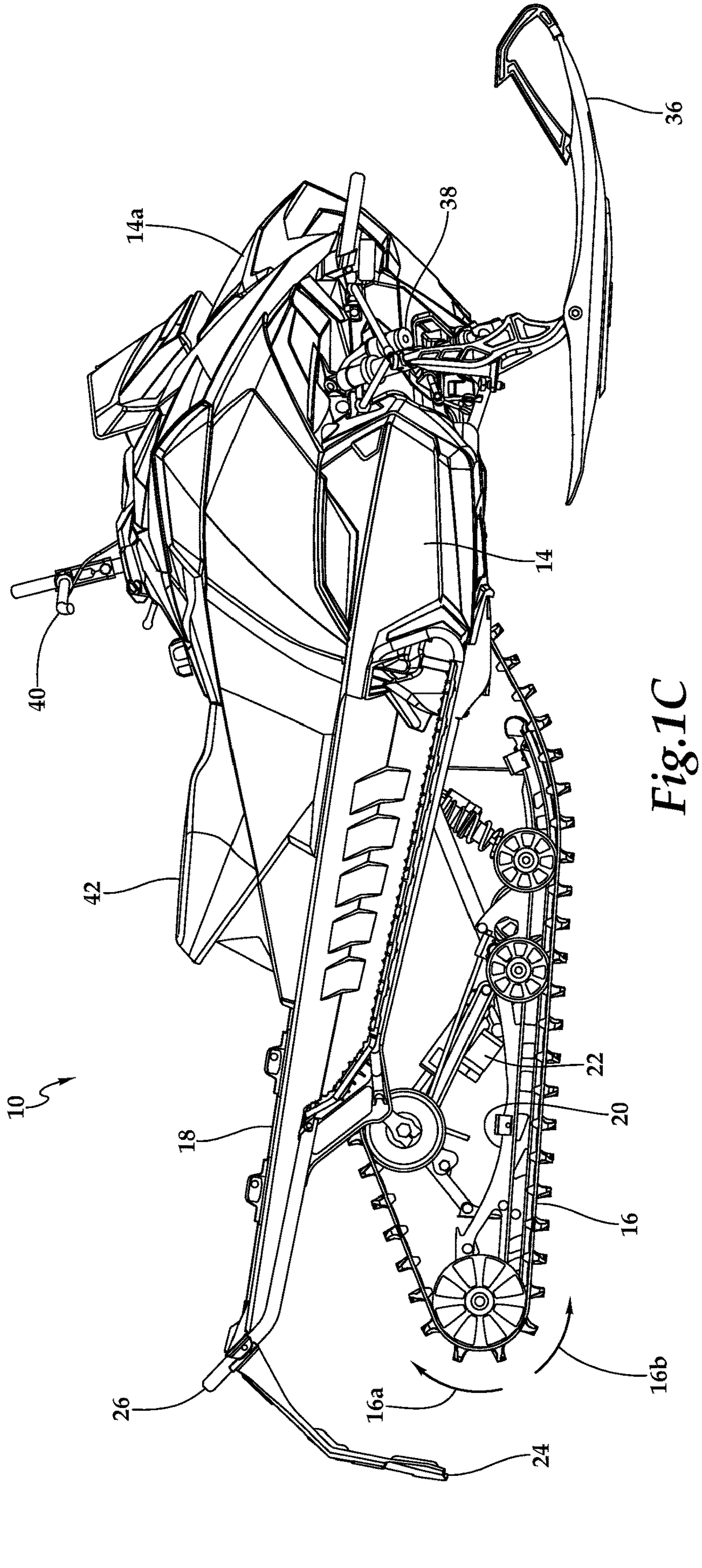
Figure 1D:
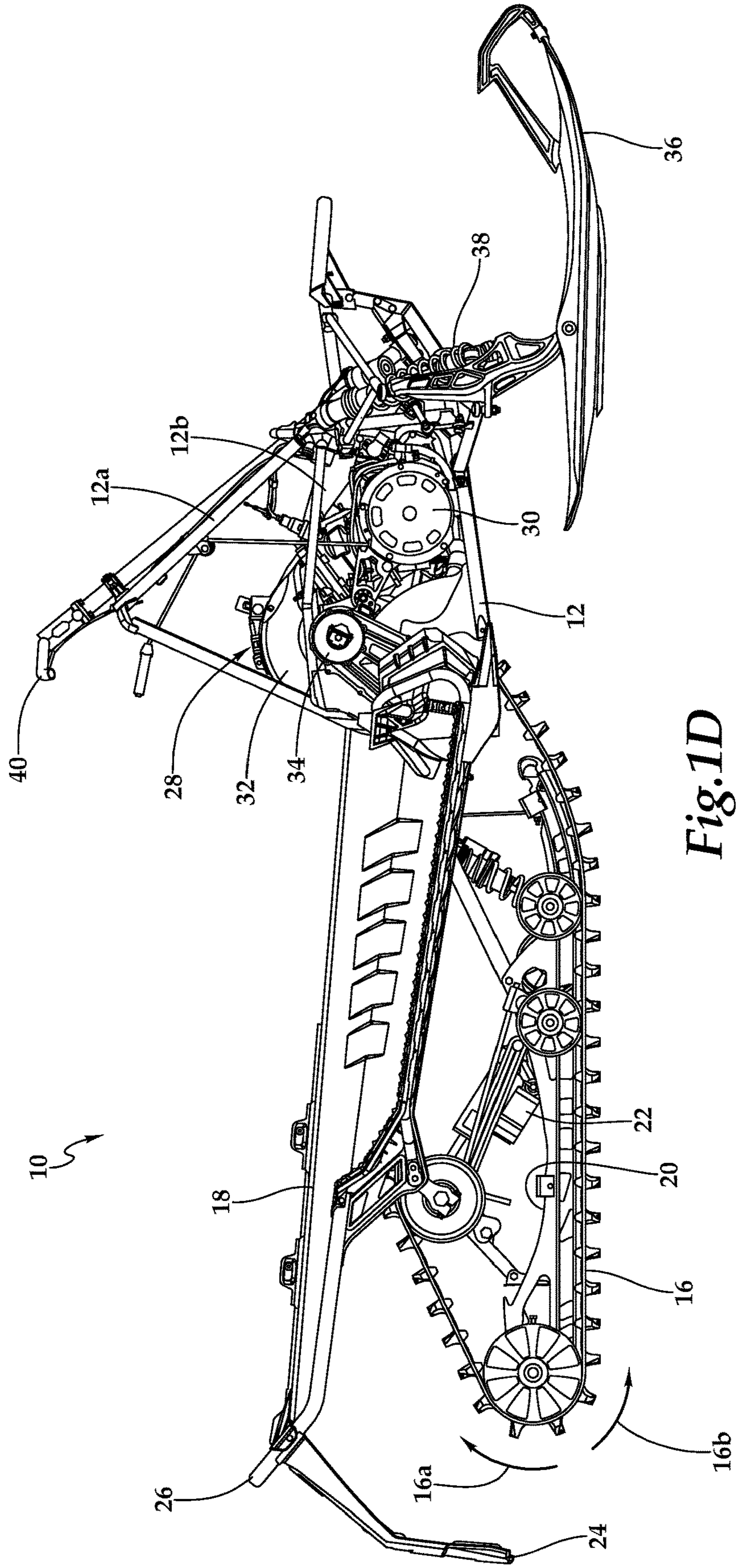

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Referring to FIGS. 1A-1D in the drawings, a land vehicle depicted as a snowmobile is schematically illustrated and generally designated 10. Structural support for snowmobile 10 is provided by chassis 12, on or around which the various components of snowmobile 10 are assembled. Chassis 12 includes a forward frame assembly 12*a* formed from interconnected tube members. One or more shrouds 14 cover and protect the various components of snowmobile 10 including parts of chassis 12. For example, front shroud 14*a* shields underlying componentry from snow and shields the operator of snowmobile 10 from oncoming terrain and cold air during operation. Shrouds 14 have been removed in FIG. 1D to illustrate underlying components of snowmobile 10 including chassis 12. A drive track 16 at least partially disposed within a tunnel 18 is in contact with the ground to provide ground propulsion for snowmobile 10. Drive track 16 is supported by a track frame 20 having an internal suspension 22. Track frame 20 may be coupled to forward frame assembly 12*a* via a swing arm having a coil spring, a rigid strut, a torsion spring, an elastomeric member or any other suitable coupling configuration. Drive track 16 rotates around track frame 20 in either direction 16*a* to propel snowmobile 10 forward or direction 16*b* to propel snowmobile 10 backward. In alternative embodiments, drive track 16 may instead be a wheel or tire. A rear flap 24 deflects snow emitted by drive track 16. A lift handle 26 may be used to lift the aft end of snowmobile 10.

A powertrain 28 including an engine 30 and a continuously variable transmission 32 is coupled to chassis 12 and provides rotational energy to rotate drive track 16 around track frame 20. Engine 30 resides in a bay 12*b* formed within forward frame assembly 12*a* of chassis 12. Engine 30 may be any type of engine such as a four-stroke engine, and in other embodiments may be an electric motor or other prime mover. Engine 30 may be naturally aspirated or include a power adder such as a belt-driven or gear-driven supercharger or a turbocharger. Engine 30 may be fuel injected or include a carburetor. Transmission types other than a continuously variable transmission may alternatively be used to control the rotational energy provided to drive track 16. In some implementations, rotational energy may be provided to drive track 16 without the need for continuously variable transmission 32. Powertrain 28 also includes a reversible belt drive assembly 34 switchable between forward and reverse modes. In the forward mode, reversible belt drive assembly 34 moves drive track 16 in direction 16*a* to propel snowmobile 10 forward. In the reverse mode, reversible belt drive assembly 34 moves drive track 16 in direction 16*b* to propel snowmobile 10 backward.

Skis 36 and a front suspension assembly 38 provide front end support for snowmobile 10. Skis 36 are interconnected to handlebar 40, which are used by an operator to steer snowmobile 10 in a leftward or rightward direction. When handlebar 40 is rotated, skis 36 responsively pivot to turn snowmobile 10. The operator controls snowmobile 10 from a seat 42 atop tunnel 18 and behind handlebar 40. Handlebar 40 includes a reverse mode selector 44 that may be engaged by the operator of snowmobile 10 to select between the forward and reverse modes of reversible belt drive assembly 34. Reverse mode selector 44 may be a button, toggle switch, lever, voice-activated control or any other operator interface permitting a mode selection. In some embodiments, when reverse mode is selected using reverse mode selector 44, snowmobile 10 may emit a sound signaling that snowmobile 10 is in reverse. A reverse indicator light may be activated on a gauge or other portion of snowmobile 10 in reverse mode.

It should be appreciated that snowmobile 10 is merely illustrative of a variety of vehicles that can implement the embodiments disclosed herein. Indeed, reversible belt drive assembly 34 may be implemented on any ground-based vehicle. Other vehicle implementations can include motorcycles, snow bikes, all-terrain vehicles (ATVs), utility vehicles, recreational vehicles, scooters, automobiles, mopeds, straddle-type vehicles and the like. As such, those skilled in the art will recognize that reversible belt drive assembly 34 can be integrated into a variety of vehicle configurations. It should be appreciated that even though ground-based vehicles are particularly well-suited to implement the embodiments of the present disclosure, airborne vehicles and devices such as aircraft can also implement the embodiments.

Figure 2A:
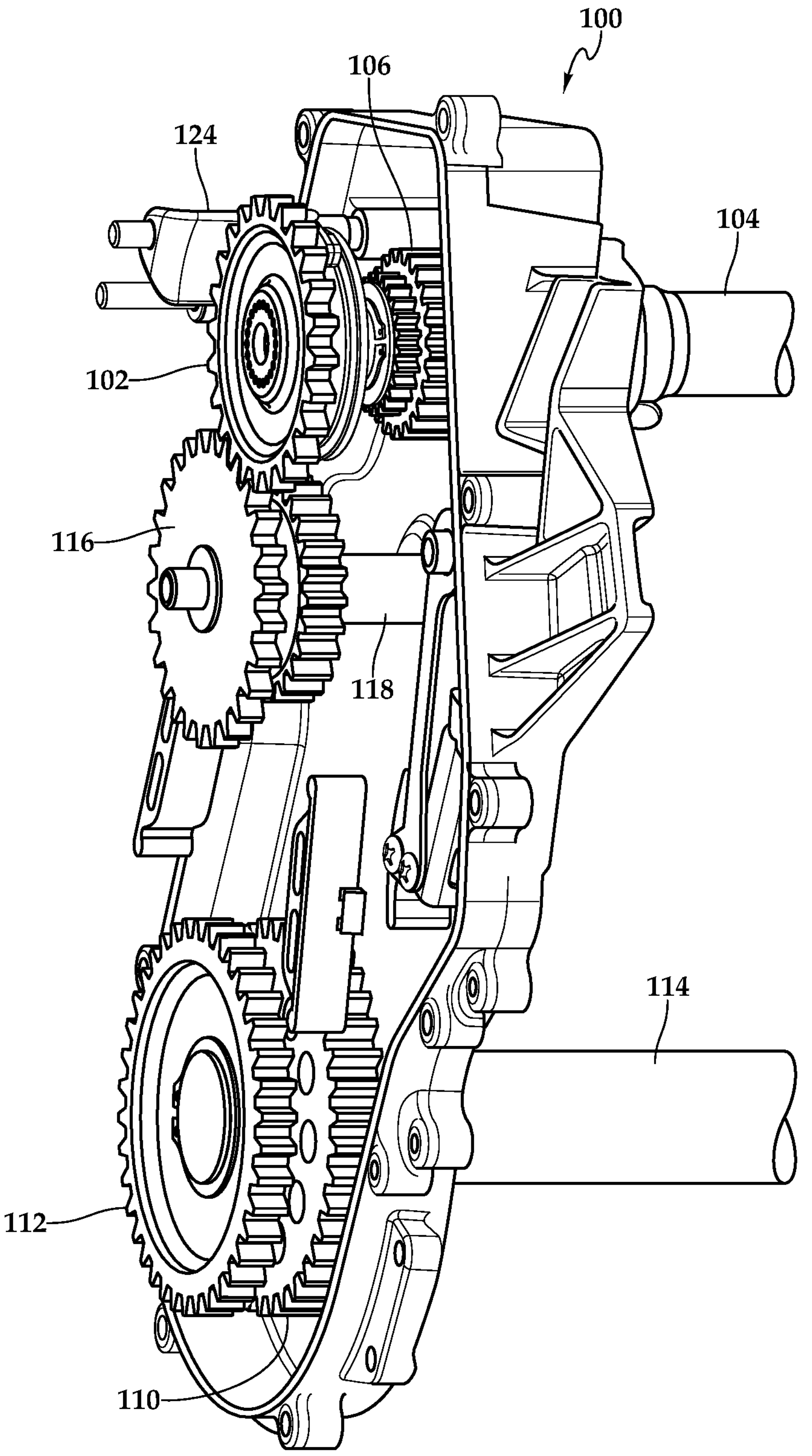
FIGS. 2A-2C are various views of a gearbox used in previous snowmobiles to provide reverse capability.
Figure 2B:
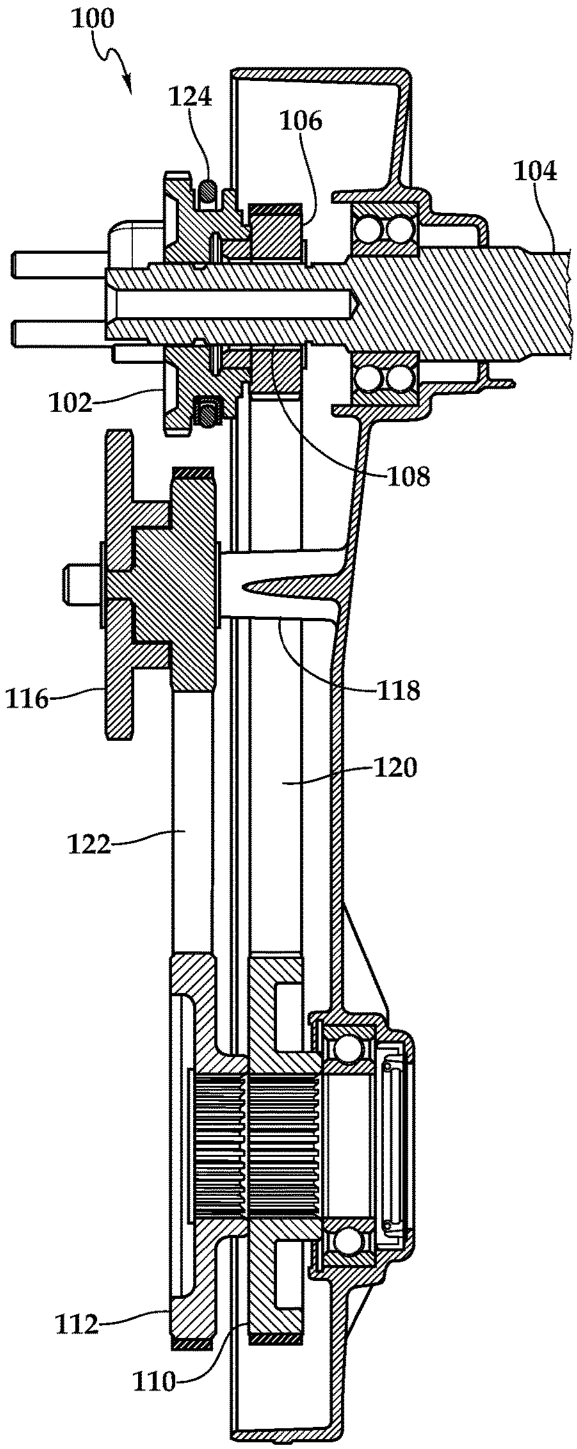
Figure 2C:
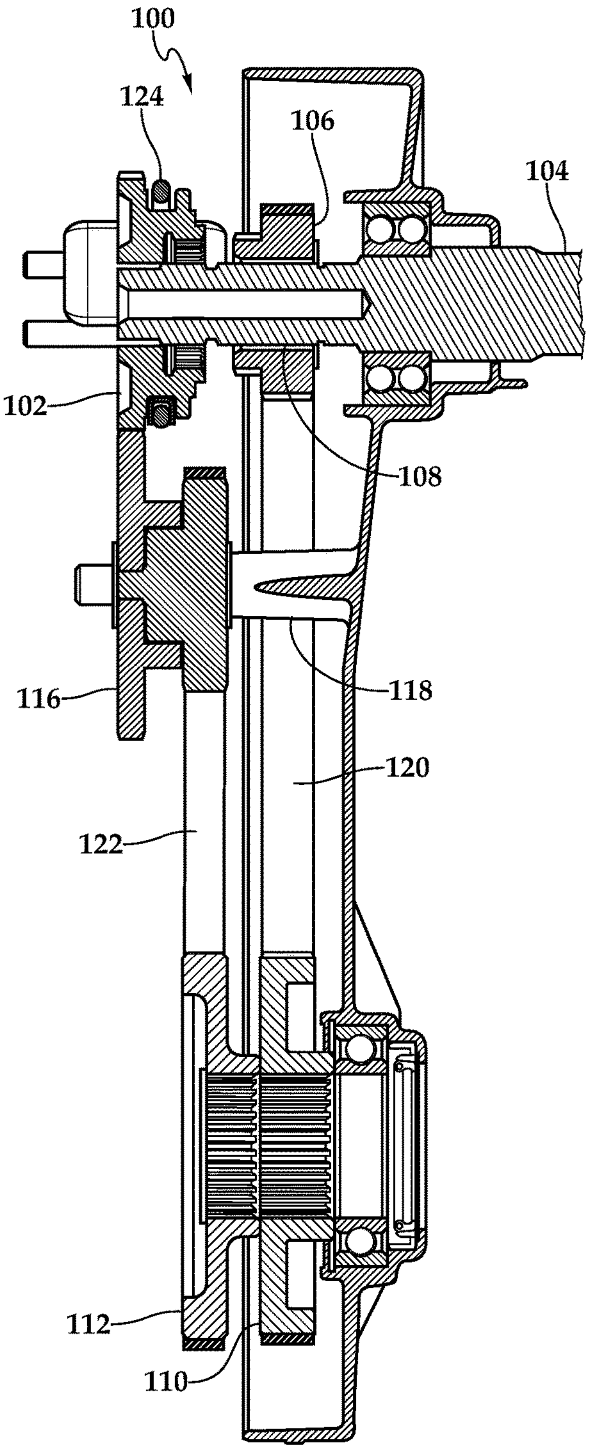

Referring to FIGS. 2A-2C in the drawings, a chain drive assembly used in previous snowmobiles is schematically illustrated and generally designated 100. Some types of engines such as certain two-stroke engines are reversible and therefore capable of propelling a snowmobile in both the forward and reverse directions without the need for additional gearing. Other types of engines such as certain four-stroke engines, however, are operable in only a single direction and therefore require additional gearing to enable reverse capability for the snowmobile. Chain drive assembly 100 is an example of such a gearing mechanism that enables a snowmobile to travel in reverse. Chain drive assembly 100 has a cover that is not shown to expose the components therein. FIG. 2B illustrates chain drive assembly 100 in a forward mode and FIGS. 2A and 2C illustrate chain drive assembly 100 in a reverse mode. Chain drive assembly 100 includes a top shiftable gear 102 that is splined to an input shaft 104 and a top forward gear 106 that is freely rotatable relative to input shaft 104 via a bearing 108. Chain drive assembly 100 also includes bottom forward and reverse gears 110, 112, both of which are splined to an output shaft 114. Output shaft 114 may be coupled to a ground-engaging component of the snowmobile such as a drive track. A top reverse gear 116 is rotatably coupled to an idler shaft 118. As shown in FIGS. 2B and 2C, top forward gear 106 and bottom forward gear 110 are interconnected by a forward chain 120 and top reverse gear 116 and bottom reverse gear 112 are interconnected by a reverse chain 122. Forward and reverse chains 120, 122 are not shown in FIG. 2A to expose underlying elements.

A shift fork 124 is coupled to top shiftable gear 102 and moves top shiftable gear 102 between the forward mode position shown in FIG. 2B and the reverse mode position shown in FIGS. 2A and 2C. When shift fork 124 moves top shiftable gear 102 into the forward mode position, top shiftable gear 102 comes into splined engagement with top forward gear 106 so that rotational energy from input shaft 104 is transferred to top forward gear 106 via top shiftable gear 102. Rotational energy is then transferred from top forward gear 106 to bottom forward gear 110 via forward chain 120 to rotate output shaft 114 in a direction that causes the vehicle to move forward. Conversely, when shift fork 124 moves top shiftable gear 102 into the reverse mode position, top shiftable gear 102 meshes with top reverse gear 116 to rotate top reverse gear 116 in the opposite direction as top shiftable gear 102. Rotational energy is then transferred from top reverse gear 116 to bottom reverse gear 112 via reverse chain 122 to rotate output shaft 114 in a direction that causes the vehicle to move backward. Previous snowmobiles have used these and similar chain-driven gear mechanisms, some of which require an enclosed housing filled with lubricating fluid to prevent wear, to reversibly transfer rotational energy from input shaft 104 to output shaft 114.

Figure 3A:
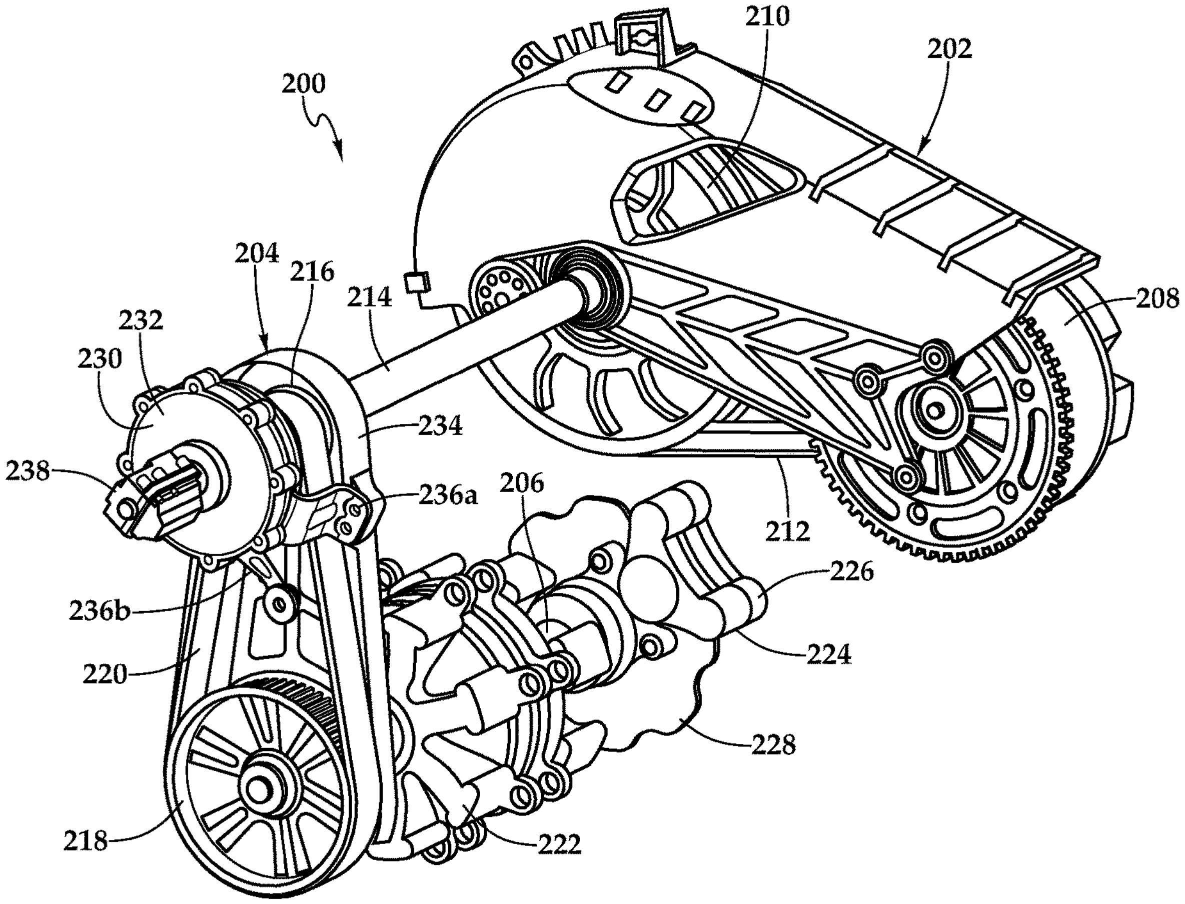
FIGS. 3A-3C are various views of a snowmobile drivetrain having a reversible belt drive assembly in accordance with embodiments of the present disclosure.
Figure 3B:
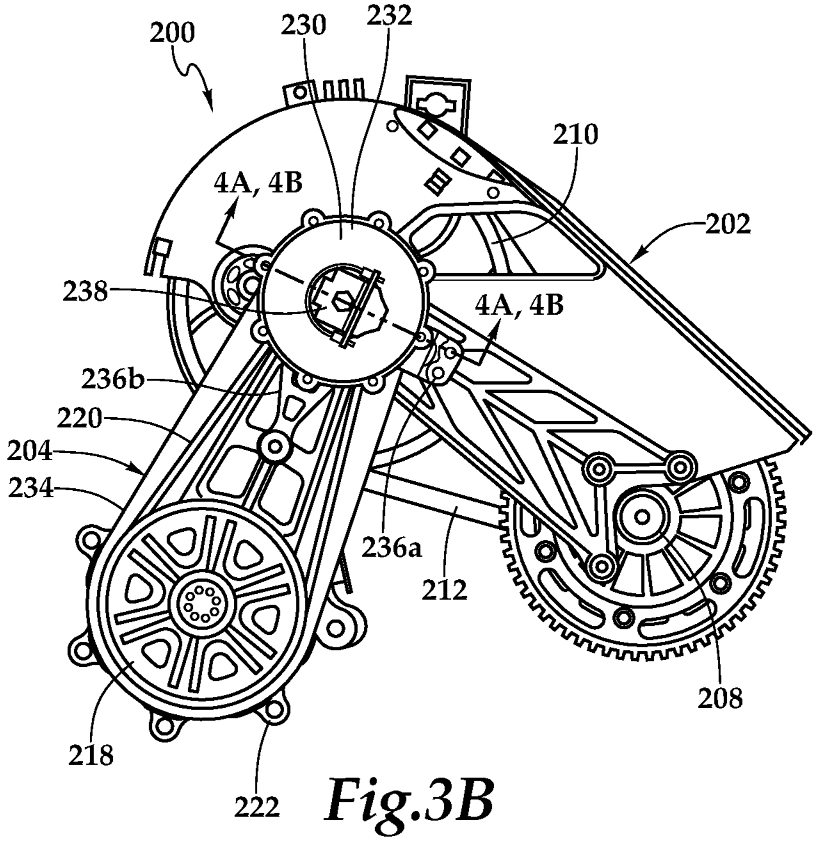
Figure 3C:
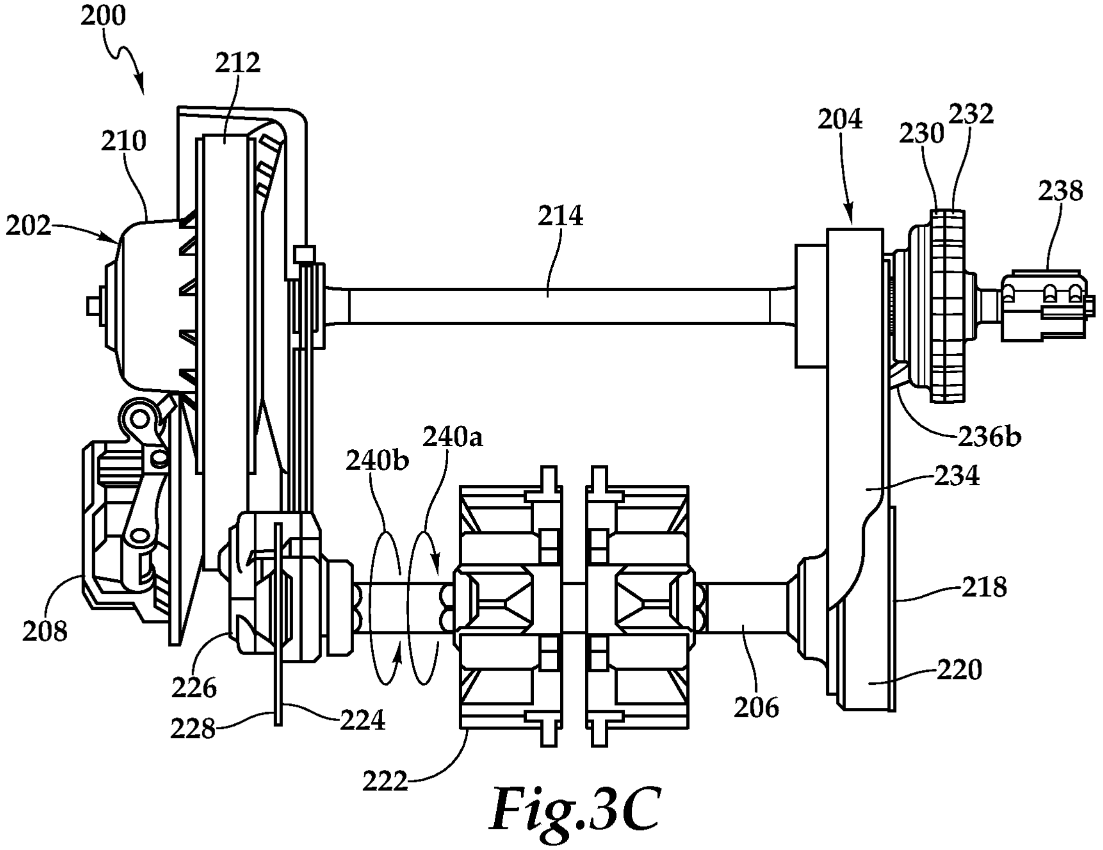

Referring to FIGS. 3A-3C in the drawings, a drivetrain portion of powertrain 28 in FIGS. 1A-1D is depicted in additional detail as drivetrain 200 including continuously variable transmission 202, reversible belt drive assembly 204 and a track driveshaft 206. The output of engine 30 in FIGS. 1A-1D is received as rotational energy by a primary clutch 208 via a driveshaft (not shown). Primary clutch 208 is connected to a secondary clutch 210 by a belt 212 such as a V-belt to form continuously variable transmission 202, which transmits the rotational energy received from engine 30 to a jack shaft 214. Primary clutch 208 and secondary clutch 210 each include a stationary sheave and a moveable sheave with belt 212 pinched therebetween. As the speed of engine 30 increases or decreases, the moveable sheaves move toward or away from the stationary sheaves to selectively alter the effective gear ratio of continuously variable transmission 202. Reversible belt drive assembly 204 includes a top pulley 216 that receives rotational energy from secondary clutch 210 via jack shaft 214, although additional gears may be interposed between jack shaft 214 and top pulley 216 as described herein. Reversible belt drive assembly 204 also includes a bottom pulley 218 connected to top pulley 216 via a belt 220 to receive reversible rotational energy therefrom. In some embodiments, reversible belt drive assembly 204 may be coupled to forward frame assembly 12*a*, tunnel 18 or other portions of snowmobile 10 depicted in FIGS. 1A-1D. One end of track driveshaft 206 is coupled to bottom pulley 218 of reversible belt drive assembly 204, from which rotational energy is received. In this manner, track driveshaft 206 receives reversible rotational energy from an engine such as engine 30 in FIGS. 1A-1D via continuously variable transmission 202 and reversible belt drive assembly 204.

Drive track engagement sprockets 222 are fixedly coupled near the center of track driveshaft 206. Drive track engagement sprockets 222 engage cogs or other features on the inside of drive track 16 in FIGS. 1A-1D to provide rotational energy from track driveshaft 206 to drive track 16. A disc-and-caliper braking system 224 is located at the end of track driveshaft 206 opposite of reversible belt drive assembly 204. Braking system 224 includes a caliper assembly 226 and a brake rotor 228, both of which are coupled to track driveshaft 206. The brake pads of caliper assembly 226 press upon brake rotor 228 to slow or stop track driveshaft 206, thereby slowing or stopping the snowmobile.

Disposed on the outboard side of top pulley 216 is a planetary gear system 230 protected by a planetary gear system housing 232. Reversible belt drive assembly 204 includes a frame 234 to which planetary gear system housing 232 is mounted via mounting arms 236*a*, 236*b*. An actuator 238 is coupled to the outboard side of planetary gear system housing 232. Actuator 238 switches reversible belt drive assembly 204 between forward and reverse modes. When reversible belt drive assembly 204 is engaged in the forward mode by actuator 238, rotational energy is transferred from jack shaft 214 to top pulley 216 such that planetary gear system 230 is bypassed and track driveshaft 206 is rotated in direction 240*a* so as to move the snowmobile forward. Conversely, actuator 238 may engage planetary gear system 230 in the reverse mode such that rotational energy is transferred from jack shaft 214 to top pulley 216 via planetary gear system 230 and track driveshaft 206 is rotated in direction 240*b* so as to move the snowmobile backward. In this manner, planetary gear system 230 is engaged only when the snowmobile is in the reverse mode.

Figure 4A:
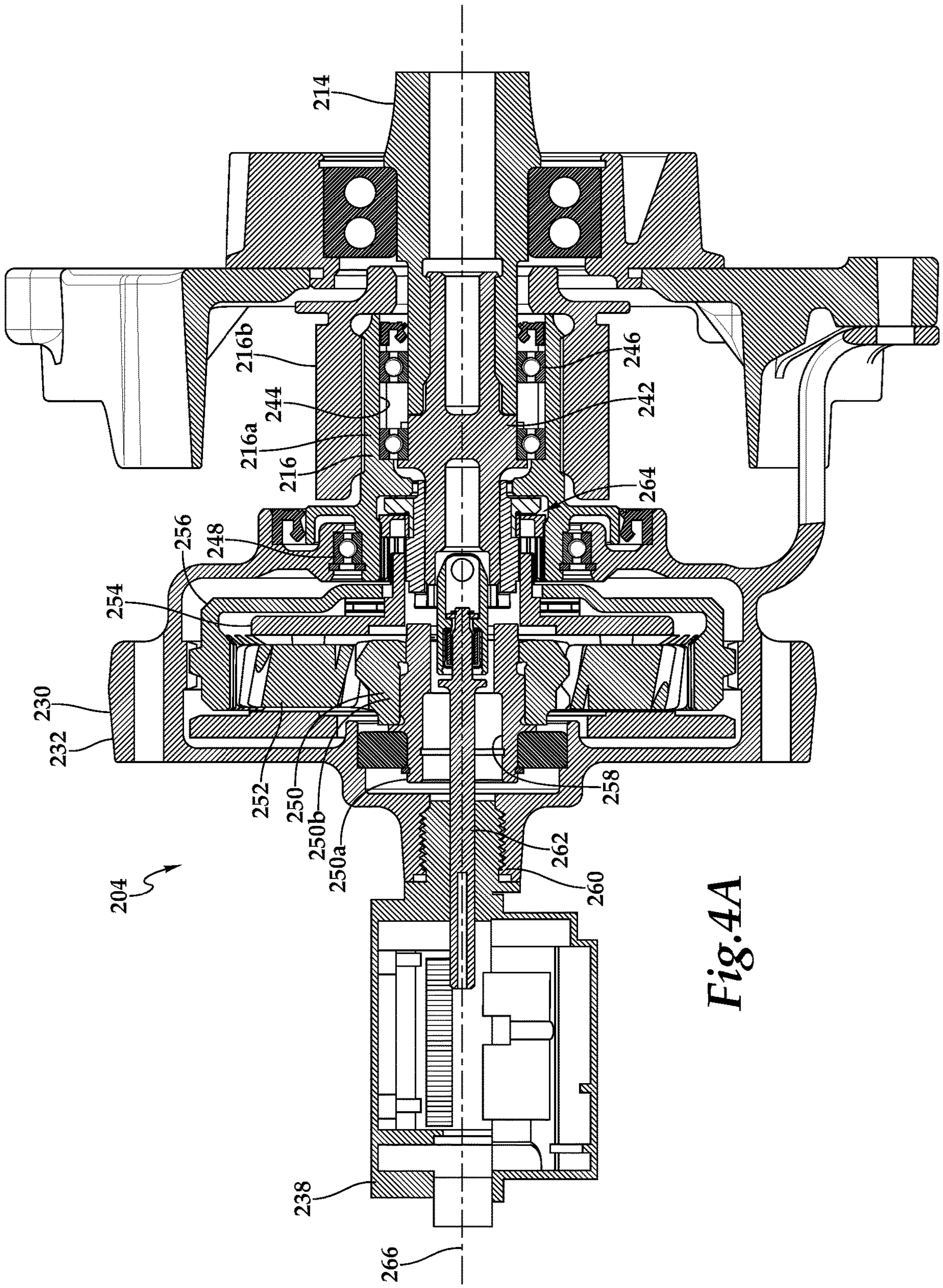
FIGS. 4A-4D are various views of a reversible belt drive assembly in accordance with embodiments of the present disclosure.
Figure 4B:
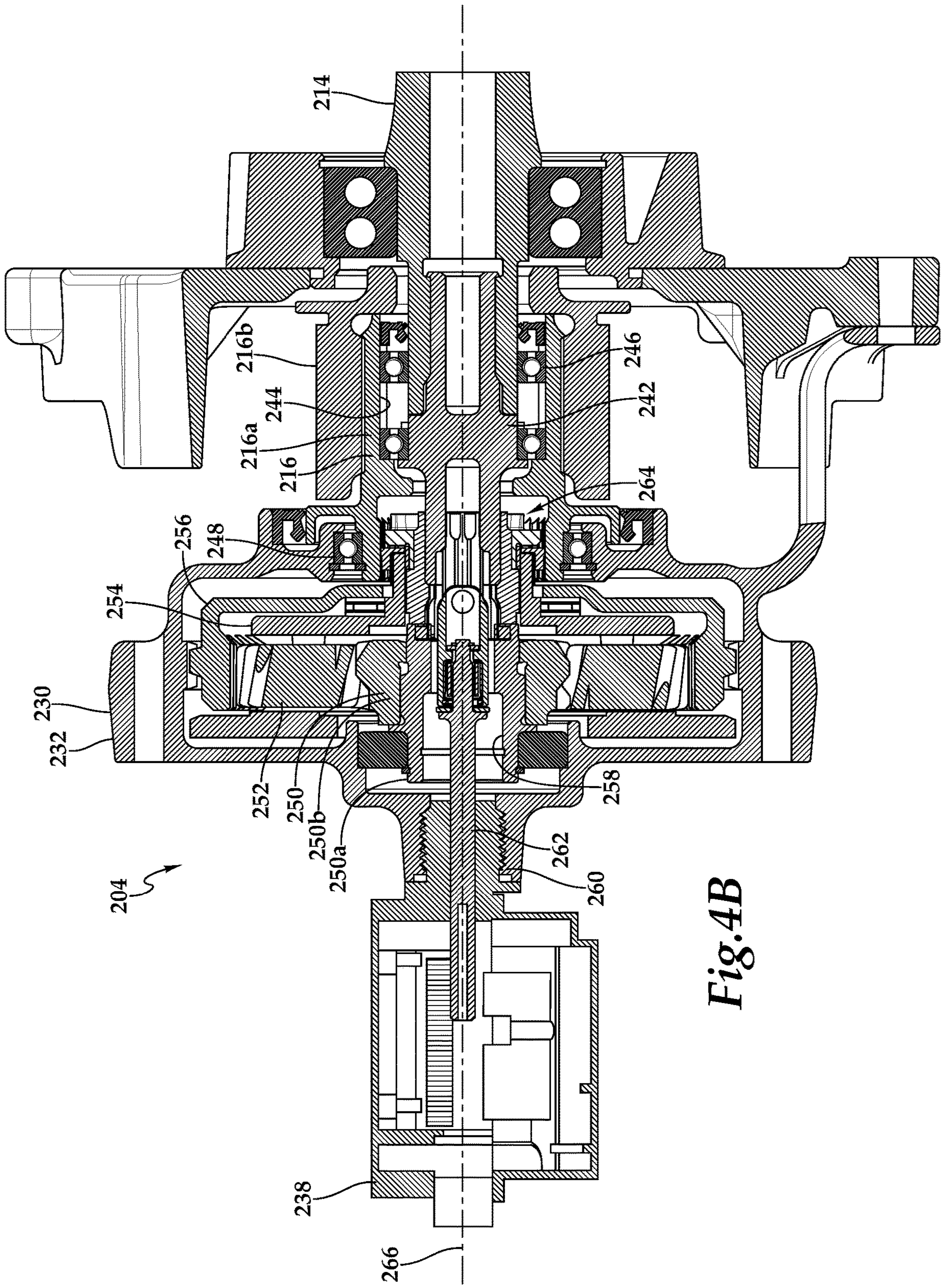
Figure 4C:
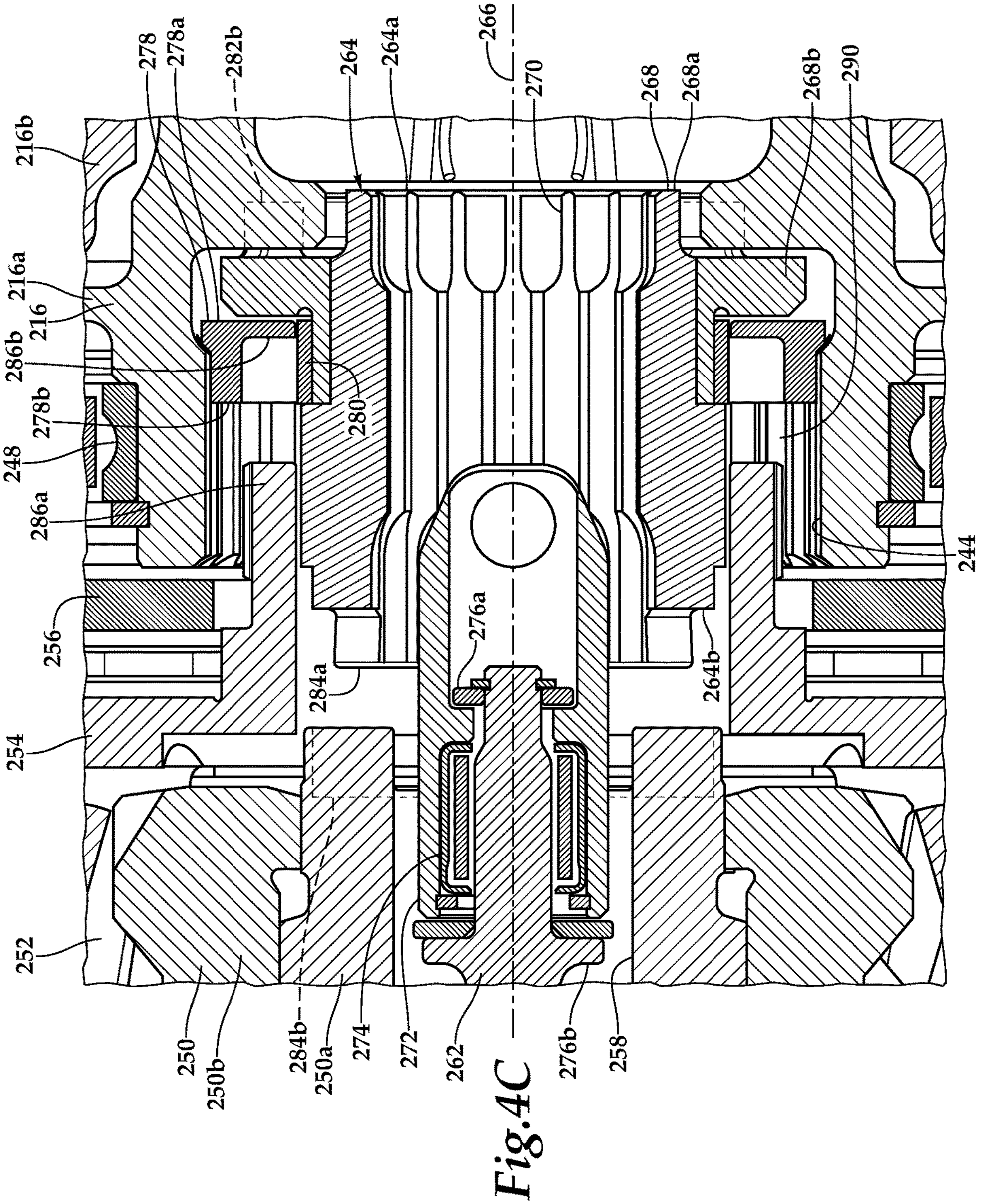
Figure 4D:
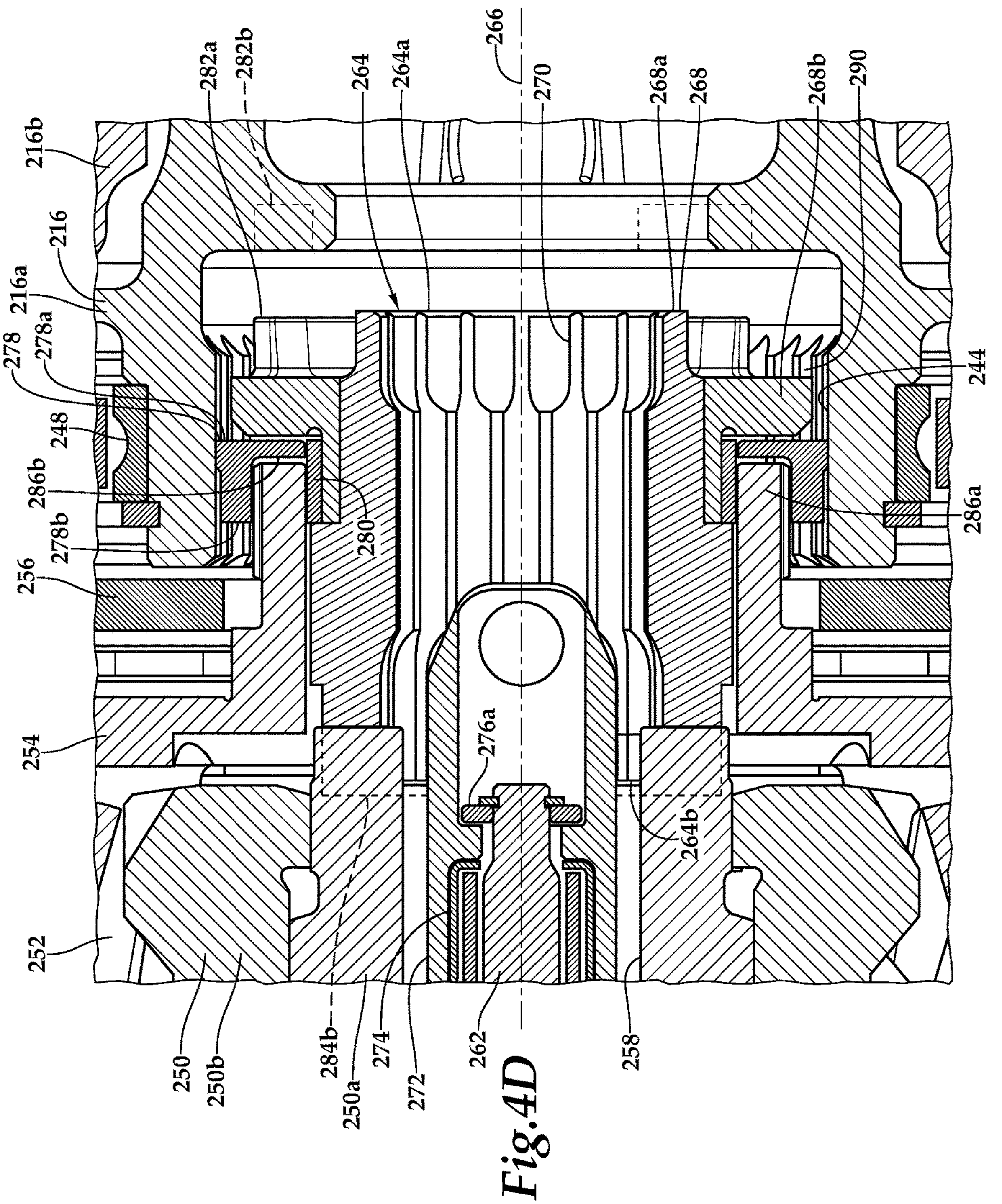

Referring additionally to FIGS. 4A-4D in the drawings, cross-sectional views of reversible belt drive assembly 204 are shown to illustrate internal components therein. FIGS. 4A and 4B are cross-sectional views taken along line 4A,4B-4A,4B in FIG. 3B. FIGS. 4C and 4D are zoomed-in views of the central portions of FIGS. 4A and 4B, respectively. FIGS. 4A and 4C show reversible belt drive assembly 204 in the forward mode and FIGS. 4B and 4D show reversible belt drive assembly 204 in the reverse mode. Reversible belt drive assembly 204 receives rotational energy from an engine via jack shaft 214, which is splined or otherwise coupled to gearbox input shaft 242. Gearbox input shaft 242 is not shown in FIGS. 4C and 4D to better illustrate underlying components. Although gearbox input shaft 242 is illustrated as a separate component splined to jack shaft 214, in other embodiments gearbox input shaft 242 may be integral with jack shaft 214 to form a single monolithic shaft. Gearbox input shaft 242 extends through a central bore 244 formed by top pulley 216. Gearbox input shaft 242 is rotatably coupled to central bore 244 via bearings 246 to maintain selective free rotation thereto depending on the mode of reversible belt drive assembly 204. Top pulley 216 is formed from an output shaft portion 216*a* splined or otherwise coupled to an outer gear teeth portion 216*b* engaged with belt 220, although in other embodiments output shaft portion 216*a* may be integral with outer gear teeth portion 216*b* to form a single monolithic top pulley 216. Outer gear teeth portion 216*b* surrounds output shaft portion 216*a* and is coaxial therewith. In the illustrated embodiment, central bore 244 is formed through the center of output shaft portion 216*a* of top pulley 216. Various outer gear teeth portions 216*b* having different shapes, sizes or teeth configurations may be interchangeably splined or otherwise coupled to output shaft portion 216*a* to provide reversible belt drive assembly 204 with different gear ratios between top and bottom pulleys 216, 218.

Planetary gear system 230 including planetary gear system housing 232 is disposed outboard of top pulley 216 and gearbox input shaft 242. Planetary gear system housing 232 is rotatably coupled to output shaft portion 216*a* of top pulley 216 via bearings 248 so that top pulley 216 may rotate while planetary gear system housing 232 remains fixed. Planetary gear system 230 includes a sun gear 250, planetary gears 252, planetary carrier 254 and ring gear 256. In the illustrated embodiment, ring gear 256 is locked, or fixed, relative to planetary gear system housing 232, although in other embodiments ring gear 256 may be unlocked, or rotatable, relative to planetary gear system housing 232. Sun gear 250 includes an inner bore portion 250*a* splined or otherwise coupled to an outer gear teeth portion 250*b*, although in other embodiments inner bore portion 250*a* may be integral with outer gear teeth portion 250*b* to form a single monolithic sun gear 250. Inner bore portion 250*a* forms a central bore 258. Actuator 238 is coupled to the outboard side of planetary gear system housing 232 via threaded connection 260. Actuator 238 is depicted as a linear actuator that translates an actuator rod 262, although other types of actuators may be utilized. Actuator rod 262 extends through and is translatable along central bore 258 formed by sun gear 250. The inboard end of actuator rod 262 is rotatably coupled to a selector collar assembly 264.

Figure 5A:
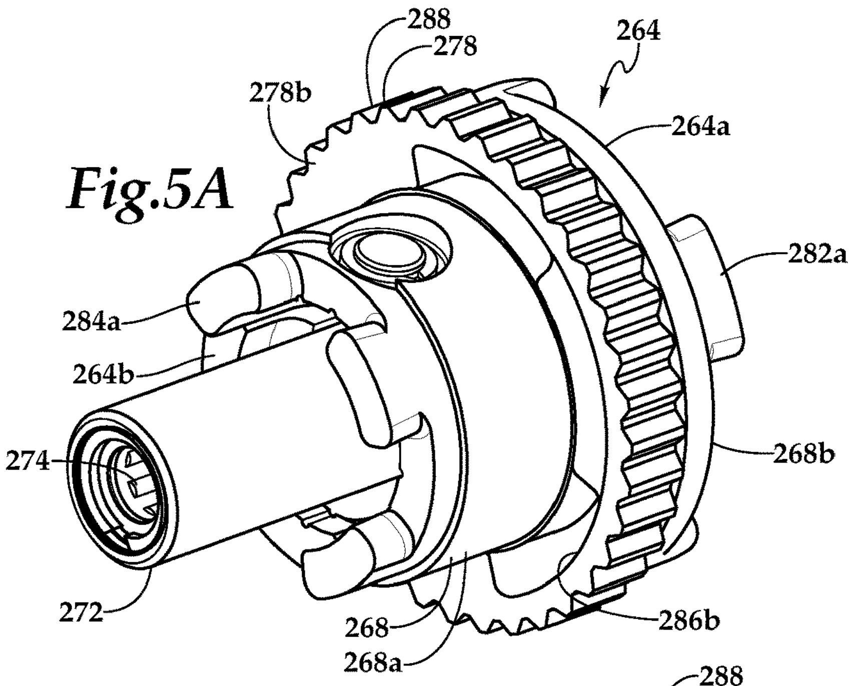
FIGS. 5A-5C are various views of a selector collar assembly used to select between forward and reverse modes in a reversible belt drive assembly in accordance with embodiments of the present disclosure.
Figure 5B:
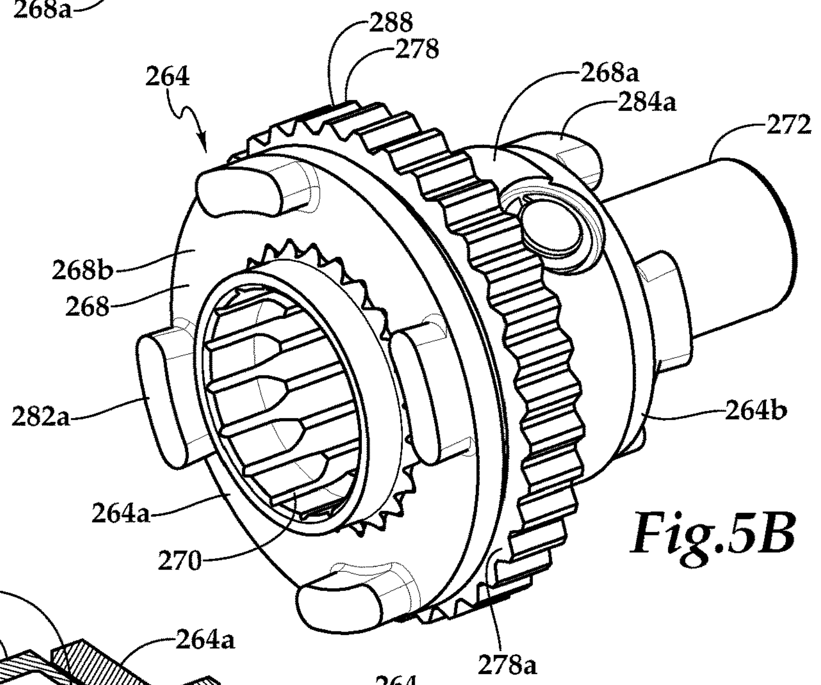
Figure 5C:
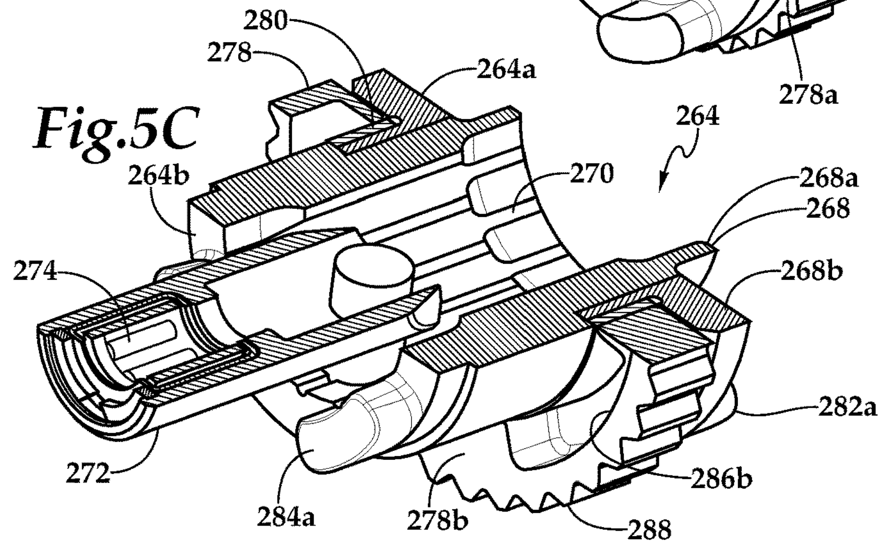

Referring to FIGS. 5A-5C in conjunction with FIGS. 4A-4D, selector collar assembly 264 is interposed between top pulley 216 and planetary gear system 230. Gearbox input shaft 242, top pulley 216 including output shaft portion 216*a* and outer gear teeth portion 216*b*, selector collar assembly 264 and sun gear 250 of planetary gear system 230 are coaxial along a common axis 266. Selector collar assembly 264 is translatable along common axis 266 to select between the forward mode shown in FIGS. 4A and 4C and the reverse mode shown in FIGS. 4B and 4D. Both top pulley 216 and gearbox input shaft 242 are at least partially disposed on pulley-facing side 264*a* of selector collar assembly 264. Selector collar assembly 264 includes a central body 268 formed from an inner bore portion 268*a* splined or otherwise coupled to an outer gear portion 268*b*, although in other embodiments inner bore portion 268*a* may be integral with outer gear portion 268*b* to form a single monolithic central body 268. Central body 268 forms a splined central bore 270 through which gearbox input shaft 242 at least partially extends. Selector collar assembly 264 is slidable along the splined connection formed with gearbox input shaft 242 at splined central bore 270.

Selector collar assembly 264 includes an actuator linkage 272 coupled to splined central bore 270 via a peg or other fixed connection. The inboard end of actuator rod 262 is rotatably coupled to actuator linkage 272 via a bearing 274, which in the illustrated embodiment is depicted as a needle bearing. Flanges 276*a*, 276*b* sandwich a portion of actuator linkage 272 so that translational, or axial, motion of actuator rod 262 along common axis 266 is transferred to selector collar assembly 264. Flange 276*a* is illustrated as a separate component coupled to the inboard end of actuator rod 262 using a collar, although in other embodiments flange 276*a* may be integral with actuator rod 262. Likewise, flange 276*b*, which is illustrated as being integral with actuator rod 262, may be a separate component coupled to actuator rod 262. Actuator rod 262 may also be fixed axially to actuator linkage 272 using other coupling techniques. Bearing 274, however, permits free rotation of selector collar assembly 264 relative to actuator rod 262. Selector collar assembly 264 includes a reverse engagement ring 278 surrounding and rotatably coupled to central body 268 via a bearing 280. Reverse engagement ring 278 is fixed axially to central body 268 while bearing 280 allows free rotation of reverse engagement ring 278 relative to central body 268. Reverse engagement ring 278 has a pulley-facing side 278*a* and a planetary gear system-facing side 278*b*.

Actuator 238 translates selector collar assembly 264 between the forward mode position shown in FIGS. 4A and 4C in which a forward geartrain is formed that bypasses planetary gear system 230 when reversible belt drive assembly 204 is in the forward mode and the reverse mode position shown in FIGS. 4B and 4D in which a reverse geartrain is formed that includes planetary gear system 230 when reversible belt drive assembly 204 is in the reverse mode. The forward mode position of selector collar assembly 264 is inboard of the reverse mode position of selector collar assembly 264. Actuator 238 may be commanded to translate selector collar assembly 264 between the forward and reverse mode positions using an operator interface such as reverse mode selector 44 in FIGS. 1A-B.

In the forward mode of reversible belt drive assembly 204 shown in FIGS. 4A and 4C, selector collar assembly 264 is translated inboard by actuator 238 to engage with output shaft portion 216*a* of top pulley 216 via dogs 282*a* formed on pulley-facing side 264*a* of central body 268. Dogs 282*a* are received by negative dogs, or cavities, 282*b* formed on the outboard side of output shaft portion 216*a* of top pulley 216. In the forward mode position, planetary gear system-facing side 264*b* of central body 268 and reverse engagement ring 278 are disengaged from planetary gear system 230 such that selector collar assembly 264 is disengaged from planetary gear system 230. Thus, the forward geartrain, or power path, formed in the forward mode of reversible belt drive assembly 204 includes gearbox input shaft 242, which transfers rotational energy to selector collar assembly 264 via splined central bore 270, which transfers rotational energy to output shaft portion 216*a* of top pulley 216 via dogs 282*a*, 282*b*, which transfers rotational energy to outer gear teeth portion 216*b* of top pulley 216 via a splined connection such that gearbox input shaft 242, selector collar assembly 264 and top pulley 216 each rotate in the same rotational direction, causing track driveshaft 206 to rotate so as to move the snowmobile forward. Planetary gear system 230 is bypassed in the forward mode.

In the reverse mode of reversible belt drive assembly 204 shown in FIGS. 4B and 4D, selector collar assembly 264 is translated outboard by actuator 238 to engage with planetary gear system 230. In the reverse mode position, central body 268 of selector collar assembly 264 is engaged with sun gear 250 of planetary gear system 230 via dogs 284*a* formed on planetary gear system-facing side 264*b* of central body 268. Dogs 284*a* are received by negative dogs 284*b* formed on the inboard side of sun gear 250. Also in the reverse mode position, reverse engagement ring 278 of selector collar assembly 264 is engaged with planetary carrier 254 of planetary gear system 230 via dogs 286*a* formed on the inboard side of planetary carrier 254. Dogs 286*a* are received by negative dogs 286*b* formed on planetary gear system-facing side 278*b* of reverse engagement ring 278. Although central body 268 is disengaged from output shaft portion 216*a* of top pulley 216, reverse engagement ring 278 is engaged with central bore 244 formed by output shaft portion 216*a* of top pulley 216 via a slidable splined connection between outer teeth 288 of reverse engagement ring 278 and inner spline 290 formed on the outboard end of central bore 244. Outer teeth 288 of reverse engagement ring 278 are slidable along inner spline 290 of central bore 244 so that selector collar assembly 264 including reverse engagement ring 278 is slidable along common axis 266. Thus, the reverse geartrain, or power path, formed in the reverse mode of reversible belt drive assembly 204 includes gearbox input shaft 242, which transfers rotational energy to selector collar assembly 264 via splined central bore 270, which transfers rotational energy to sun gear 250 via dogs 284*a*, 284*b*, which transfers rotational energy to planetary gears 252, which transfers rotational energy to planetary carrier 254, which transfers rotational energy to reverse engagement ring 278 of selector collar assembly 264 via dogs 286*a*, 286*b*, which transfers rotational energy to output shaft portion 216*a* of top pulley 216 via the splined connection formed by outer teeth 288 and inner spline 290, which transfers rotational energy to outer gear teeth portion 216*b* of top pulley 216 via a splined connection such that top pulley 216 and reverse engagement ring 278 rotate in the opposite rotational direction as gearbox input shaft 242 and central body 268, causing track driveshaft 206 to rotate so as to move the snowmobile backward. In this manner, planetary gear system 230 is included in the reverse geartrain and bypassed in the forward geartrain.

It will be appreciated by one of ordinary skill in the art that dogs 282*a*, 284*a*, 286*a* and negative dogs 282*b*, 284*b*, 286*b* forming the dog gears described herein may be reversed in any combination such that dogs 282*a*, 284*a*, 286*a* are negative dogs and negative dogs 282*b*, 284*b*, 286*b* are dogs. For example, dogs 282*a* on pulley-facing side 264*a* of central body 268 may instead be negative dogs and negative dogs 282*b* on the outboard side of top pulley 216 may instead be dogs. Bypassing planetary gear system 230 in the forward mode minimizes inertia in drivetrain 200 when the snowmobile is moving forward. The illustrative embodiments also provide a simplified design for a reversible gearbox that minimizes wear and reduces or eliminates the need for large enclosures filled with lubricating fluid.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. For example, numerous combinations of the features disclosed herein will be apparent to persons skilled in the art including the combining of features described in different and diverse embodiments, implementations, contexts, applications and/or figures. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A powertrain for a snowmobile comprising:

an engine;

a gearbox input shaft receiving rotational energy from the engine; and a reversible belt drive assembly coupled to the gearbox input shaft, the reversible belt drive assembly switchable between a forward mode and a reverse mode and comprising:

a pulley;

a planetary gear system coaxial with the pulley; and a selector collar assembly interposed between the pulley and the planetary gear system translatable between a first position to form a forward geartrain bypassing the planetary gear system in the forward mode and a second position to form a reverse geartrain including the planetary gear system in the reverse mode.

2. The powertrain as recited in claim 1 wherein the gearbox input shaft, the pulley, the selector collar assembly and the planetary gear system are coaxial to form a common axis therewith, the selector collar assembly translatable along the common axis.

3. The powertrain as recited in claim 1 wherein the pulley forms a central bore therethrough, the gearbox input shaft extending through the central bore of the pulley.

4. The powertrain as recited in claim 1 wherein the planetary gear system is disposed on an outboard side of the pulley.

5. The powertrain as recited in claim 1 wherein the selector collar assembly comprises a central body having a central bore therethrough, the gearbox input shaft extending at least partially through the central bore of the central body, the central body slidably coupled to the gearbox input shaft via a spline.

6. The powertrain as recited in claim 1 wherein the selector collar assembly comprises a central body having a pulley-facing side and a planetary gear system-facing side, the pulley-facing side of the central body engaged with the pulley via first dogs in the first position, the planetary gear system-facing side of the central body engaged with the planetary gear system via second dogs in the second position.

7. The powertrain as recited in claim 6 wherein the selector collar assembly comprises a reverse engagement ring rotatably coupled to the central body, the reverse engagement ring engaged with the planetary gear system via third dogs in the second position.

8. The powertrain as recited in claim 7 wherein the planetary gear system-facing side of the central body is engaged with a sun gear of the planetary gear system via the second dogs in the second position and the reverse engagement ring is engaged with a planetary carrier of the planetary gear system via the third dogs in the second position.

9. The powertrain as recited in claim 7 wherein the reverse engagement ring is coupled to the pulley via a spline to transfer rotational energy from the planetary gear system to the pulley in the reverse mode.

10. The powertrain as recited in claim 7 wherein the pulley-facing side of the central body is disengaged from the pulley in the second position and the planetary gear system-facing sides of the central body and the reverse engagement ring are disengaged from the planetary gear system in the first position.

11. The powertrain as recited in claim 1 wherein the first position of the selector collar assembly is inboard of the second position.

12. The powertrain as recited in claim 1 wherein the selector collar assembly has a pulley-facing side, both the pulley and the gearbox input shaft at least partially disposed on the pulley-facing side of the selector collar assembly.

13. The powertrain as recited in claim 1 wherein the forward geartrain consists of gears in the following sequence: (1) the gearbox input shaft, then (2) the selector collar assembly then (3) the pulley; and wherein, the reverse geartrain consists of gears in the following sequence: (1) the gearbox input shaft, then (2) the selector collar assembly, then (3) the planetary gear system, then (4) the selector collar assembly then (5) the pulley.

14. The powertrain as recited in claim 1 wherein the reversible belt drive assembly further comprises an actuator coupled to the selector collar assembly to translate the selector collar assembly between the first and second positions.

15. The powertrain as recited in claim 14 wherein the planetary gear system comprises a planetary gear system housing, the actuator coupled to the planetary gear system housing.

16. The powertrain as recited in claim 14 wherein the planetary gear system comprises a sun gear forming a central bore therethrough and the actuator comprises an actuator rod extending through the central bore of the sun gear.

17. The powertrain as recited in claim 16 wherein the selector collar assembly comprises an actuator linkage including a bearing, the actuator rod coupled to the actuator linkage, the actuator linkage transferring translational motion from the actuator rod to the selector collar assembly, the selector collar assembly freely rotatable relative to the actuator rod via the bearing.

18. A snowmobile comprising:

a chassis;

a powertrain coupled to the chassis, the powertrain comprising:

an engine;

a gearbox input shaft receiving rotational energy from the engine; and a reversible belt drive assembly coupled to the gearbox input shaft, the reversible belt drive assembly switchable between a forward mode and a reverse mode and comprising:

a pulley;

a planetary gear system coaxial with the pulley; and a selector collar assembly interposed between the pulley and the planetary gear system translatable between a first position to form a forward geartrain bypassing the planetary gear system in the forward mode and a second position to form a reverse geartrain including the planetary gear system in the reverse mode; and a drive track receiving rotational energy from the reversible belt drive assembly such that the drive track is moveable in a first direction to propel the snowmobile forward in the forward mode and a second, opposite direction to propel the snowmobile backward in the reverse mode.

19. The snowmobile as recited in claim 18 wherein the pulley comprises an upper pulley and the reversible belt drive assembly further comprises:

a lower pulley; and a belt engaging the upper and lower pulleys;

wherein, the powertrain further comprises a track driveshaft coupled to the lower pulley to transfer rotational energy to the drive track, the track driveshaft rotating in a first direction in the forward mode and a second, opposite direction in the reverse mode.

20. The snowmobile as recited in claim 18 wherein the pulley comprises an output shaft portion coupled to an outer gear teeth portion.

* * * * *